Nov. 20, 1923.　　　　　　　　　　　　　　　　1,474,610
F. E. SCHARTOW
NONSKID DEVICE
Filed April 29, 1920
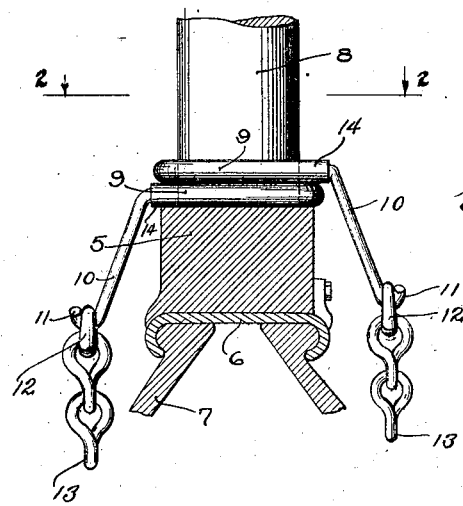
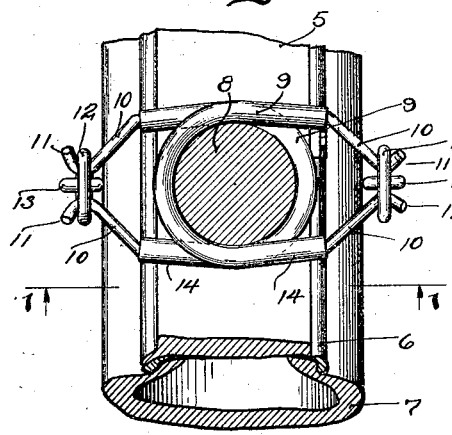
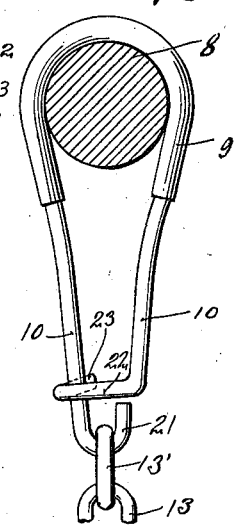
Inventor.
Frank E. Schartow
By Morsell + Keeney
Attorneys.

Patented Nov. 20, 1923.

1,474,610

UNITED STATES PATENT OFFICE.

FRANK E. SCHARTOW, OF RACINE, WISCONSIN, ASSIGNOR TO THE MIDLAND COMPANY, OF SOUTH MILWAUKEE, WISCONSIN, A CORPORATION OF WISCONSIN.

NONSKID DEVICE.

Application filed April 29, 1920. Serial No. 377,580.

*To all whom it may concern:*

Be it known that I, FRANK E. SCHARTOW, a citizen of the United States, and resident of Racine, in the county of Racine and State of Wisconsin, have invented new and useful Improvements in Nonskid Devices, of which the following is a description, reference being had to the accompanying drawings, which are a part of this specification.

The present invention relates to certain new and useful improvements in attaching member for non-skid devices of a character wherein a chain is attached to the vehicle wheel and extends about the tire so as to lie between the contacting surface of the tire and the road bed.

One object of the present invention is to provide an improved attaching member for non-skid members so that the chain may be readily detached when desired and so constructed that the terminal eyes or links of the tread member provide the means for securing the attaching member upon the wheel.

Another object of this invention is to provide an attaching device of the class described formed of spring wire and engageable about a spoke of the wheel and provided with attaching hooks for retaining a terminal link or eye of a tread member in position and at the same time securing the attaching member upon the wheel spoke.

A further object of the present invention is to provide an improved form of tool for use in connection with my attaching member for assisting in the securement of the same to and detachment from the wheel spoke.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, and in which:

Figure 1 is a view taken through a portion of a rim of a vehicle wheel on the plane indicated by the line 1—1 of Figure 2, the wheel being equipped with my invention;

Figure 2 is a view part in section and part in elevation taken on the line 2—2 of Figure 1;

Figure 3 is a perspective view of one of my attaching members and the tool employed in connection therewith;

Figure 4 is a perspective view of one end of a tread member illustrating the improved form of terminal link or eye which I provide; and Figure 5 is a plan view of one of the attaching members illustrating a slightly modified form of construction, the vehicle spoke to which the member is attached being shown in section.

Referring now more particularly to the accompanying drawing, 5 designates a vehicle wheel felly, 6 a tire rim secured to the outer surface thereof, and 7 a tire, which in the present instance is illustrated as being a pneumatic tire. My device includes two complementary attaching members adapted to engage about any one of the spokes 8 of the wheel and each includes a single length of spring wire bent to provide a substantially U-shaped inner portion 9 which is engageable about the wheel spoke and having the outer portion of the ends of the U directed outwardly from the edges of the felly and then radially as at 10 and as clearly shown in Figs. 1 and 3.

The portions 10 are normally urged apart by the resiliency of the material of which the members are constructed, and have their extreme ends bent inwardly to provide hooks 11 over which is engaged the terminal link or eye 12 of a tread member 13. The terminal eye 12 is substantially V-shaped and is retained upon the hooks of the attaching member by the pressure of the portions 10 thereof which are normally urged apart as before described.

As illustrated in Figs. 1 and 2, two attaching members are provided for each tread member 13, the portions 10 of one attaching member being positioned at one side of the wheel and the portions 10 of the other being positioned at the opposite side thereof. The attaching members are engaged about the wheel spoke by springing the portions 10 apart a sufficient distance and the U-shaped part 9 of the attaching member is covered by means of a substance 14 such as rubber, felt or the like to prevent scarring or marring in any manner of the spokes.

While the tension of the portions 10 may be overcome by the pressing of the same together by the hand, I provide an improved form of tool to permit the springing of the same together for attaching or detaching the adjacent terminal eye 12, which tool consists of a lever 15 having its inner end notched as at 16 for engagement with one portion 10 and having its other end providing an operating handle 17. Pivoted as at 18 to the lever 15 adjacent its inner end is a link 19 having its free end notched as at 20 for engagement with the other portion 10, and with the portions 10 positioned in the notches 16 and 20, an outward pull on the handle 17 will force the portions 10 together and permit the ready attachment to or removal from the hooks 11 of the adjacent terminal link.

As will be readily obvious to those skilled in the art to which an invention of this character appertains I have devised an attaching member for non-skid chains or tread members which is extremely simple in construction but practical in operation and I have also provided a tool for use in connection therewith for facilitating the ready attachment to or detachment from the attaching members of the terminal links of a tread member.

In Fig. 5 I have illustrated a slightly modified form of my invention in which one of the end portions 10 is hooked or looped, as at 21, longitudinally with respect to the vehicle wheel and the other end portion of which is directed longitudinally, as at 22, with respect to the wheel to close the throat of the hook 21. The extreme end of the hooked portion is looped, as at 23, for detachable engagement with the other end portion 10, and with the hooked portion 23 engaged with the end 10, the terminal eye 13' of the tread member will be secured on the hook 21. To permit the disengagement of the terminal eye 13' from the hook 21, the portions 10 are forced together and the hook portion 23 disengaged from the portion 10.

As will be readily apparent, when the link or terminal eye 12 is placed upon the hooks 11 of the attaching members, the U-shaped portions 9 thereof will be under tension and firmly clamped around the adjacent spoke to thus prevent movement of the same with respect thereto and thus eliminate wear.

What I claim as my invention is:

1. A device of the class described comprising a U-shaped resilient member adapted to be seated about the spoke of a wheel from one side of the wheel with the extremities thereof projecting on the side opposite that from which it is seated, the legs of said member normally tending to spring away from each other, one of said legs having a hook adapted to be engaged by the terminal link of a chain, the extremity of the other of said legs being bent around and provided with a hook adapted to engage the first mentioned leg, thereby holding the legs closely together and clamping the member tightly about the spoke.

2. A device of the class described comprising a U-shaped resilient member adapted to be seated about the spoke of a wheel from one side of the wheel with the extremities thereof projecting on the side opposite that from which it is seated, the legs of said member normally tending to spring away from each other, one of said legs having a hook adapted to be engaged by the terminal link of a chain, the extremity of the other of said legs being bent around and provided with a hook adapted to engage the first mentioned leg, thereby holding the legs closely together and clamping the member tightly about the spoke, said bent around portion of the second mentioned leg substantially closing the throat of the hook provided on the first mentioned leg and preventing disengagement of the link from the hook.

In testimony whereof I affix my signature.

FRANK E. SCHARTOW.